United States Patent [19]

Yang

[11] Patent Number: 5,574,341
[45] Date of Patent: Nov. 12, 1996

[54] COMPOUND MOTOR LIMITING CONTROL CIRCUIT FOR CONTROLLABLE SHUNT FIELD WINDING BY MEANS

[76] Inventor: Tai-Her Yang, 5-1 Taipin St., Si-Hu Town, Dzan-Hwa, Taiwan

[21] Appl. No.: 431,979

[22] Filed: May 1, 1995

Related U.S. Application Data

[63] Continuation of Ser. No. 87,414, Jul. 8, 1993, abandoned.

[51] Int. Cl.$^6$ ........................................... H02P 5/04
[52] U.S. Cl. ..................... 318/139; 388/803; 318/786
[58] Field of Search ................... 318/700–799; 388/803–830

[56] References Cited

U.S. PATENT DOCUMENTS

| | | | |
|---|---|---|---|
| 3,601,673 | 8/1971 | Mason | 318/308 |
| 3,671,830 | 6/1972 | Kruper | 318/786 |
| 3,766,457 | 10/1973 | Fink, Jr. et al. | 318/786 |
| 3,792,324 | 2/1974 | Suarez et al. | 318/786 |
| 4,047,082 | 9/1977 | Scheuer et al. | 318/786 |
| 4,138,629 | 2/1979 | Miller et al. | 318/140 |
| 4,330,742 | 5/1982 | Reimers | 318/139 |
| 4,409,532 | 10/1983 | Hollenbeck et al. | 318/749 |
| 4,520,303 | 5/1985 | Ward | 318/778 |
| 4,604,563 | 8/1986 | Min | 318/786 |
| 4,605,888 | 8/1986 | Kim | 318/786 |
| 4,622,506 | 11/1986 | Shemanske et al. | 318/786 |
| 4,651,077 | 3/1987 | Woyski | 318/781 |
| 4,658,195 | 4/1987 | Min | 318/786 |
| 4,751,439 | 6/1988 | Buchwald et al. | 318/305 |
| 4,801,858 | 1/1989 | Min | 318/786 |
| 4,806,838 | 2/1989 | Weber | 318/729 |
| 4,862,053 | 8/1989 | Jordan et al. | 318/786 |
| 4,942,346 | 7/1990 | Ardit et al. | 318/280 |
| 5,041,771 | 8/1991 | Min | 318/786 |
| 5,289,093 | 2/1994 | Jobard | 318/434 |

*Primary Examiner*—Paul Ip
*Attorney, Agent, or Firm*—Bacon & Thomas

[57] ABSTRACT

A control circuit for controlling the excitation current in a compound motor includes a limiting switch connected in series with the shunt field winding of the compound motor. The limiting switch is closed whenever either the speed of the motor is excessive, the armature current is excessive, or there is insufficient back EMF due to a light load.

4 Claims, 1 Drawing Sheet

COMPOUND MOTOR LIMITING CONTROL CIRCUIT FOR CONTROLLABLE SHUNT FIELD WINDING BY MEANS

This application is a continuation of application Ser. No. 08/087,414, filed on Jul. 8, 1993, which is now abandoned.

SUMMARY OF THE INVENTION

The present invention is a control circuit for controlling the excitation current in the shunt field winding of a compound motor by means of a limiting switch, the limiting switch being controlled in response to sensing of an operating state of the motor, and particularly to a control circuit of the above-stated type in which the limiting switch closes when the motor running speed is too high, such that the cumulative excitation type shunt winding of the compound motor is excited while the motor running speed is being reduced. In addition, the action point of the limiting switch can be controlled to change the motor running speed.

DETAILED DESCRIPTION OF THE INVENTION

A conventional series motor limiting control usually includes a centrifugal switch connected in series between the power supply and the series, as opposed to shunt, motor. The conventional centrifugal switch is arranged to cut off the power supply during an over-speed condition, and to close when the speed is reduced to provide a speed limiting function. In such an arrangement, the cut-off power involves the full power of motor, so that the motor capacity is greatly limited.

The present compound motor limiting control circuit, in contrast, involves controlling the shunt field winding, as opposed to the series field winding, by means of the limiting switch, based on the operating state of motor. Specifically, the limiting switch of the present design includes either: (1) a solid state or electro-mechanical switch controlled by a motor speed-sensing device; (2) a motor EMF sensing control; (3) a motor armature current control; or (4) centrifugal type switch sensing control.

Figure 1:
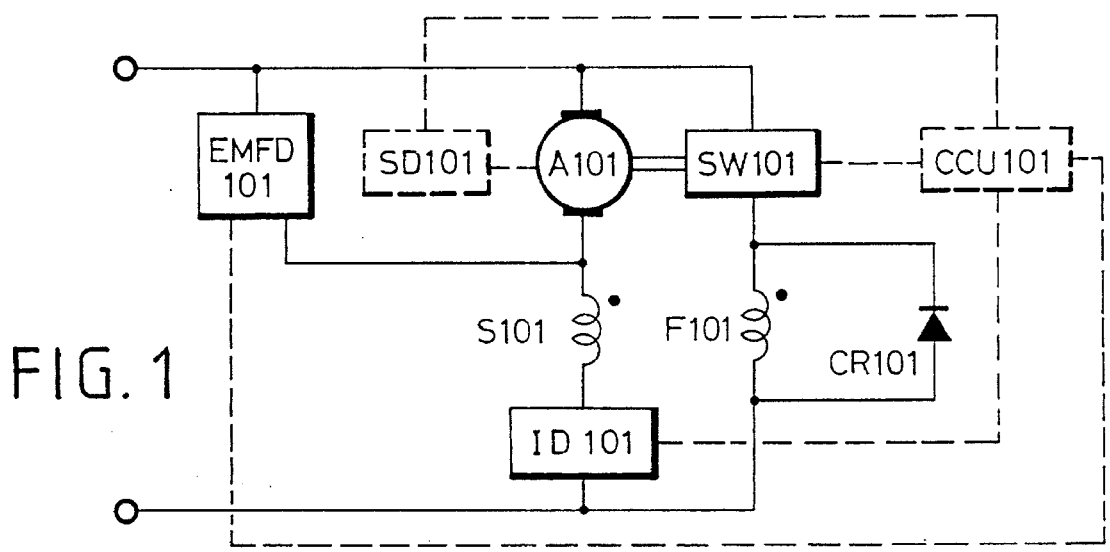
FIG. 1 is a schematic diagram showing a preferred compound motor control circuit which controls the shunt field winding excitation by means of a limiting switch.

FIG. 1 is a diagram illustrating the basic principles of the compound motor control circuit of the invention, which includes:

a series field winding S101 and an armature A101 mutually connected in series and connected in parallel to the power supply;

a limiting switch device SW101 made up of an electro-mechanical or solid state type switch controlled by the motor centrifugal force, or by a central control unit CCU101 with reference to the motor loading current, running speed or armature EMF. The limiting switch may be connected in series with the shunt field winding F101 of the compound motor and then parallel connected to the series field winding S101 and the armature A101 in a long shunt configuration, or directly parallel connected to the armature in a short shunt configuration, the series field winding and shunt field winding both having the same polarity for cumulative excitation; and a flywheel diode CR101 parallel connected to the shunt field winding F101 for absorbing EMF when the limiting switch device SW101 is cut off.

The circuit may further include a motor running speed sensing device SD101 for measuring motor speed and transmitting the data to central control unit CCU101 in either analog or digital form in order to cause the limiting device to close or open at a desired speed; or an armature EMF sensing device EMFD101 which controls the limiting switch device in order to power up the shunt field winding F101 when the EMF is rising; or an armature current sensing device ID100 which controls the limiting switch in order to power up the shunt field winding F101 when the armature current is reduced and the speed is rising due to a light load.

Central control unit CCU101 is made up of a circuit which is able to set the motor speed value and compare it with the actual running speed, and an output driving circuit for driving the limiting switch device SW101.

Figure 2:
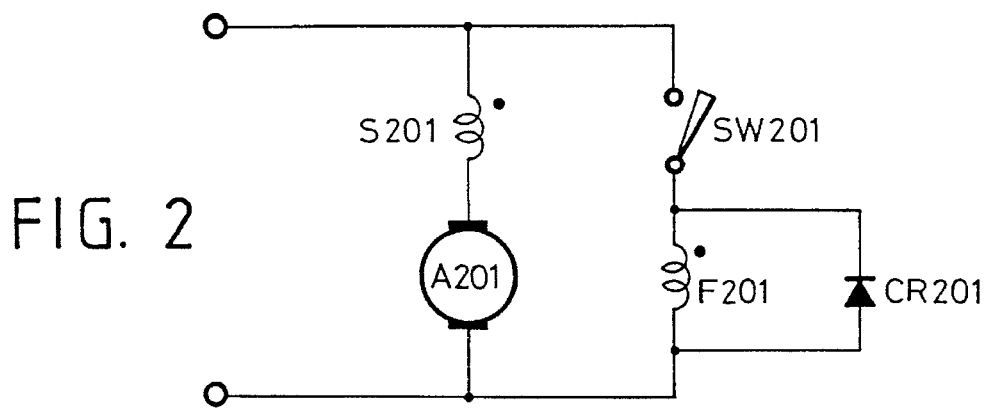
FIG. 2 is a schematic diagram showing a preferred compound motor control circuit which controls the shunt field winding excitation by means of a centrifugal switch.

FIG. 2 shows an embodiment in which the limiting switch is a centrifugal switch. The circuit of this embodiment includes:

a series field winding S201 and an armature A201 mutually connected in series and connected in parallel to the power supply;

a limiting switch device SW201 made up of an electro-mechanical switch controlled by the centrifugal force of the motor, and which may be series connected with the shunt field winding F201 of the motor and then parallel connected to the armature in a short shunt configuration, with the series field winding and shunt field winding both having the same polarity to provide cumulative excitation; and a flywheel diode connected in parallel to the shunt field winding F301 for absorbing EMF when the limiting switch device SW201 is cut off.

The aforesaid limiting switch device SW201 is driven by centrifugal force, but the action point of the centrifugal switch can be controlled by an appropriate adjustment mechanism.

Figure 3:
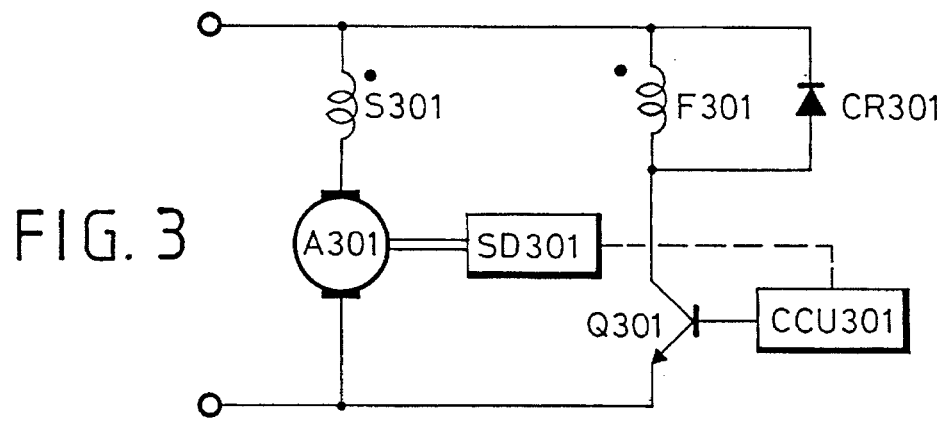
FIG. 3 is a schematic diagram showing a preferred compound motor control circuit which controls the shunt field winding excitation by means of a limiting switch made up of a transistor.

FIG. 3 shows an embodiment in which the limiting switch is made up of a power transistor. The control circuit of this embodiment includes:

a series field winding S301 and an armature A301 mutually connected in series and connected in parallel to the power supply;

a limiting switch device Q301 made up of a solid-state switch controlled by central control unit CCU301, which may be connected in series with shunt field winding F301 of the compound motor and then parallel connected to series field winding S301 and armature A301 in a long shunt configuration, or directly parallel connected to the armature in a short shunt configuration, with the series field winding and shunt field winding both having the same polarity in order to provide cumulative excitation; and a flywheel diode CR301 parallel connected to the shunt field winding F301 for absorbing EMF when the limiting switch device Q301 is cut off. device in order to power up the shunt field winding F301 when the EMF is rising; or an armature current sensing device ID300 which controls the limiting switch in order to power up the shunt field winding F301 when the armature current is reduced and the speed is rising under a light load.

Central control unit CCU301 is made up of a circuit which is able to set the motor speed value and compare it with the actual running speed, and an output driving circuit for driving the limiting switch device SW301.

In summary, the invention provides a DC compound motor control circuit for limiting the shunt field winding excitation current, as opposed to the series field winding excitation current, by means of a limiting switch. The result is an improved motor design with increased life span and controllability.

I claim:

1. In a compound DC motor, comprising:

an armature, a series field winding connected in series between the armature and a terminal of a power supply, a shunt field winding connected in parallel with the series-connected series winding and armature, and a switch connected in series between the shunt field winding and a terminal of the power supply and in parallel with the armature and series field winding; the improvement wherein:

said switch is a limit switch connected to means for measuring a speed of the motor and for controlling the limit switch be continuously open when the motor speed is below a minimum speed and to be continuously closed when the motor speed exceeds the predetermined speed.

2. A motor as claimed in claim 1, when the limit switch is a centrifugal switch responsive to rotation of the armature.

3. In a compound DC motor, comprising:

an armature, a series field winding connected in series between the armature and a terminal of a power supply, and a shunt field winding connected in parallel with the series-connected series winding and armature, and a switch connected in series between the shunt field winding and a terminal of the power supply and in parallel with the armature and series field winding; the improvement wherein:

said switch is a limit switch connected to means for sensing a current in the armature current and for controlling the limit switch to be continuously open when the current in the armature is below a predetermined armature current and to be continuously closed when the current in the armature exceeds the predetermined armature current.

4. In a compound DC motor, comprising:

an armature, a series field winding connected in series between the armature and a terminal of a power supply, and a shunt field winding connected in parallel with the series-connected series winding and armature, and a limit switch connected in series between the shunt field winding and a terminal of the power supply and in parallel with the armature and series field winding; the improvement wherein said switch is a limit switch connected to means for sensing an electromotive force (EMF) of the motor and for controlling the limit switch to be open when the EMF of the motor is below a predetermined EMF and to be closed when the motor exceeds the predetermined EMF.

* * * * *

UNITED STATES PATENT AND TRADEMARK OFFICE
CERTIFICATE OF CORRECTION

PATENT NO. : 5,574,341
DATED : November 1, 1996
INVENTOR(S) : YANG

It is certified that error appears in the above-indentified patent and that said Letters Patent is hereby corrected as shown below:

On the title page,

The serial number listed in item [21] on the face of the patent should be changed from "431,979" to - -431,797- -

Signed and Sealed this

Seventh Day of January, 1997

Attest:

BRUCE LEHMAN

*Attesting Officer*  *Commissioner of Patents and Trademarks*